US011017268B2

(12) United States Patent
Kansal et al.

(10) Patent No.: US 11,017,268 B2
(45) Date of Patent: May 25, 2021

(54) MACHINE LEARNING SYSTEM FOR IDENTIFYING POTENTIAL ESCALATION OF CUSTOMER SERVICE REQUESTS

(71) Applicant: Dell Products L.P., Round Rock, TX (US)

(72) Inventors: Varsha Kansal, New Delhi (IN); Rajkumar Dan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 138 days.

(21) Appl. No.: 16/448,618

(22) Filed: Jun. 21, 2019

(65) Prior Publication Data

US 2020/0401849 A1 Dec. 24, 2020

(51) Int. Cl.
*G06K 9/62* (2006.01)
*G06N 20/00* (2019.01)
*G06N 5/02* (2006.01)

(52) U.S. Cl.
CPC ......... *G06K 9/6256* (2013.01); *G06K 9/6282* (2013.01); *G06N 5/025* (2013.01); *G06N 20/00* (2019.01)

(58) Field of Classification Search
CPC .... G06K 9/6256; G06K 9/6282; G06N 20/00; G06N 5/025
See application file for complete search history.

(56) References Cited

U.S. PATENT DOCUMENTS

| | | | | |
|---|---|---|---|---|
| 9,804,752 | B1 * | 10/2017 | Mall | H04L 67/22 |
| 10,257,357 | B1 * | 4/2019 | Merritt | G06N 20/00 |
| 10,678,997 | B2 * | 6/2020 | Ahuja | G06F 40/174 |
| 10,878,198 | B2 * | 12/2020 | Kumar | G06N 20/00 |
| 2011/0270770 | A1 * | 11/2011 | Cunningham | G06Q 10/10 705/304 |
| 2012/0020471 | A1 * | 1/2012 | Erhart | H04M 3/5232 379/265.1 |
| 2015/0254675 | A1 * | 9/2015 | Kannan | G06Q 30/02 705/304 |
| 2016/0063065 | A1 * | 3/2016 | Khatri | G06Q 30/02 707/723 |
| 2016/0110653 | A1 * | 4/2016 | Foley | G06N 7/005 706/12 |
| 2016/0337300 | A1 * | 11/2016 | Ossia | H04L 51/043 |

(Continued)

*Primary Examiner* — Kim Y Vu
*Assistant Examiner* — Molly Delaney
(74) *Attorney, Agent, or Firm* — Terrile, Cannatti & Chambers; Stephen A. Terrile

(57) ABSTRACT

A method, system and computer-usable medium are disclosed for machine learning to identify service request records associated with an account that is likely to escalate. Certain aspects of the disclosure include generating a random forest model using a training set of service request records to determine a probability of escalation for service requests of the training set; applying the random forest model to a current set of service request records to determine an escalation probability for service requests in the current set; and assigning service request records in the current set to a plurality of escalation probability bins, wherein the service request records of the current set are generally equally divided between the plurality of escalation probability bins, and wherein the service request records of the current set are assigned to a probability bin based on the escalation probability of the service request record.

14 Claims, 11 Drawing Sheets

(56) References Cited

U.S. PATENT DOCUMENTS

| | | | |
|---|---|---|---|
| 2017/0262502 A1* | 9/2017 | Rastunkov | G06N 20/00 |
| 2017/0270416 A1* | 9/2017 | Sri | G06F 16/9535 |
| 2017/0323211 A1* | 11/2017 | Bencke | G06Q 10/0639 |
| 2017/0323233 A1* | 11/2017 | Bencke | G06N 20/20 |
| 2018/0109829 A1* | 4/2018 | Epstein | H04N 21/25883 |
| 2019/0065978 A1* | 2/2019 | Martine | H04L 67/20 |
| 2019/0102277 A1* | 4/2019 | Walenstein | G06N 5/003 |
| 2019/0102543 A1* | 4/2019 | Lew | G06F 9/545 |
| 2019/0132224 A1* | 5/2019 | Verma | H04L 47/2441 |
| 2019/0163710 A1* | 5/2019 | Haghighat Kashani | G06N 20/00 |
| 2019/0264286 A1* | 8/2019 | Dogan | C12Q 1/6883 |
| 2020/0058295 A1* | 2/2020 | Debnath | G10L 15/08 |
| 2020/0258057 A1* | 8/2020 | Farahat | G06N 3/08 |

\* cited by examiner

| Variable Name | Description |
|---|---|
| SYS_AGE | Age of the system (in days) |
| AGE_QTR | Age of system (in quarters) |
| Asst_cnt | No. of assets owned by the customer |
| SR_cnt | No. of Service Requests raised by the customer in his entire journey |
| blank_email_flg_avg | Average no. of blank e-mail flags |
| blank_email_flg_cnt | Total count of blank e-mail flags |
| TOT_ACTVY_CNT_avg | Average count of total activities per SR |
| TOT_ACTVY_CNT_max | Maximum number of activities on SR |
| SYS_CALL_INBND_NOT_OWNER_CNT_avg | Average count of System calls inbound |
| SYS_CALL_INBND_NOT_OWNER_CNT_max | Maximum number of System calls inbound |
| INBND_ACTVY_NOT_OWNER_CNT_avg | Average number of inbound activities with no owner on SRs |
| INBND_ACTVY_NOT_OWNER_CNT_max | Maximum number of inbound activities with no owner on SRs |
| INBND_CALL_OUTBND_ACTVY_CNT_avg | Average number of Outbound activities with no owner on SRs |
| INBND_CALL_OUTBND_ACTVY_CNT_max | Maximum number of Outbound activities with no owner on SRs |
| TM_RESOLVE_CLDR_HRS_avg | Average time to resolve the issue |
| TM_RESOLVE_CLDR_HRS_max | Maximum time to resolve the issue |
| CHAT_FAIL_TO_PH_FLG_avg | Shift from chat to phone flat Average |
| CHAT_FAIL_TO_PH_FLG_cnt | Shift from chat to phone flat count |
| EMAIL_FAIL_TO_PH_FLG_avg | Shift from e-mail to phone flat average |
| EMAIL_FAIL_TO_PH_FLG_cnt | Shift from e-mail to phone flat count |
| DSP_IB_avg | Inbound dispatch average |
| DSP_IB_max | Inbound dispatch maximum |
| Call_IB_avg | Average number of inbound calls |
| Call_IB_max | Maximum no. of inbound calls |
| Chat_IB_avg | Average no. of inbound chats |
| Chat_IB_max | Maximum number of inbound chats |
| Email_IB_avg | Average number of inbound e-mails |
| Email_IB_max | Maximum number of inbound e-mials |
| StoreWalkIn_IB_avg | Average number of store walkins |
| StoreWalkIn_IB_max | Maximum number of storewalkins |
| Transfers_avg | Average number of call transfers |
| Transfers_max | Maximum number of call transfers |
| RA_avg | Average number of repeat activities |
| RA_max | Maximum no. of repeat activities |
| Call_OB_avg | Average number of outbound calls |
| Call_OB_max | Maximum number of outbound calls |
| Email_OB_avg | Average numbers of outbound e-mails |
| Email_OB_max | Maximum number of outbound emails |
| DPS_CNT | Total count of dispatches made |
| Exchng_CNT | Total count of exchanges made per customer |
| good_email_flg_cnt | Count of positive e-mails from the customer |
| CONTRACT_DIFF | NO. of days left for service to expire |
| RA_ACTVY_CNT_max | Maximum no. of repeat activities from the customer |
| RA_ACTVY_CNT_avg | Average number of repeat activities from the customer |

*Figure 4*

MACHINE LEARNING SYSTEM FOR IDENTIFYING POTENTIAL ESCALATION OF CUSTOMER SERVICE REQUESTS

BACKGROUND OF THE INVENTION

Field of the Invention

The present invention relates to information handling systems. More specifically, embodiments of the invention relate to a machine learning system for identifying potential escalation of customer service requests.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufactures, retailers, OEMs, etc., provide customer support for the information systems that they provide. It is important for such organization to have more repeat purchasing customers in its portfolio. To increase the probability that a customer will be a repeat purchaser, the customer should be satisfied with both the product and the service provided by the organization. One way to maintain the confidence of the customer is to address the customer's service requests in an effective and timely manner. When service requests are not dealt with properly, the customer tends to escalate the request to higher levels of management thereby reducing the satisfaction of the customer with the organization and directing matters to higher levels of management when the matters could otherwise have been solved at a lower level within the organization.

SUMMARY OF THE INVENTION

A system of one or more computers can be configured to perform particular operations or actions by virtue of having software, firmware, hardware, or a combination of them installed on the system that in operation causes or cause the system to execute actions relating to machine learning for identifying service request records that are likely to escalate. One general aspect includes a computer-implemented method for identifying potential escalations of customer service requests, including: generating a random forest model using a training set of service request records to determine a probability of escalation for service requests of the training set; applying the random forest model to a current set of service request records to determine an escalation probability for service requests in the current set; and assigning service request records in the current set to a plurality of escalation probability bins, where the service request records of the current set are generally equally divided between the plurality of escalation probability bins, and where the service request records of the current set are assigned to a probability bin based on the escalation probability of the service request record.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: generating a random forest model using a training set of service request records to determine a probability of escalation for service requests of the training set; applying the random forest model to a current set of service request records to determine an escalation probability for service requests in the current set; and assigning service request records in the current set to a plurality of escalation probability bins, where the service request records of the current set are generally equally divided between the plurality of escalation probability bins, and where the service request records of the current set are assigned to a probability bin based on the escalation probability of the service request record.

Another general aspect includes a non-transitory, computer-readable storage medium embodying computer program code, the computer program code including computer executable instructions configured for: generating a random forest model using a training set of service request records to determine a probability of escalation for service requests of the training set; applying the random forest model to a current set of service request records to determine an escalation probability for service requests in the current set; and assigning service request records in the current set to a plurality of escalation probability bins, where the service request records of the current set are generally equally divided between the plurality of escalation probability bins, and where the service request records of the current set are assigned to a probability bin based on the escalation probability of the service request record. Other embodiments include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is a table illustrating exemplary independent variables that may be included in the historical customer service request data and used in subsequent processing to identify customer service requests that are likely to escalate;

DETAILED DESCRIPTION

Figure 1:
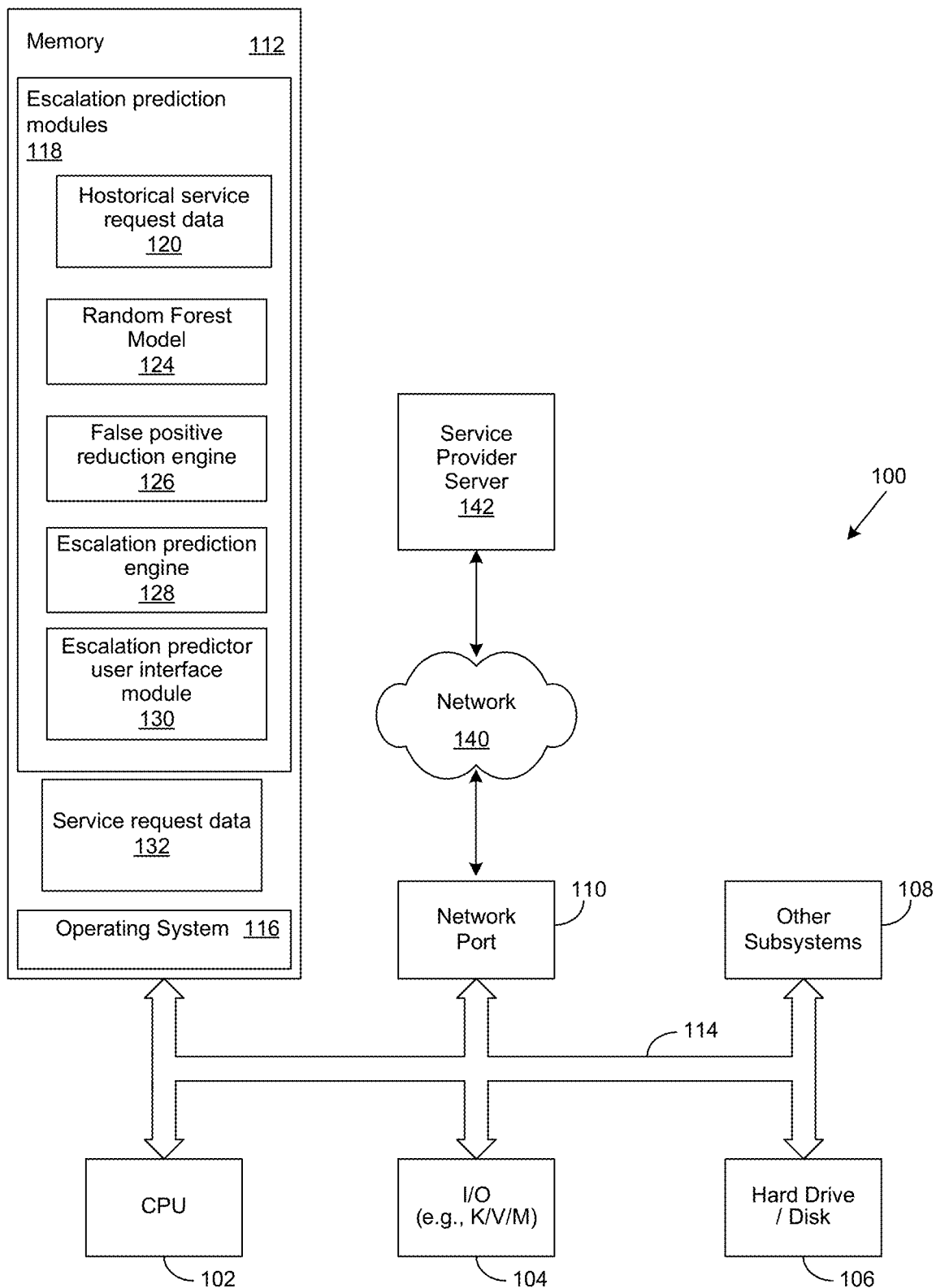
FIG. 1 is a generalized illustration of an information handling system that is configured as an escalation prediction system in accordance with certain embodiments.

A system, method, and computer-readable medium are disclosed for identifying customer service requests that may escalate. Certain aspects of the disclosure recognize that machine learning may be applied to service request records to identify service requests that are likely to escalate if not properly addressed. Certain aspects of the disclosure reflect an appreciation that is common for many organizations to furnish warranty terms and service contracts when providing a product, such as an electronic information processing system, to a customer. As used herein, the term "customer" includes, without limitation, an entity purchasing the product, an entity leasing the product, an end user of the product, etc. Certain aspects of the disclosure also recognize that customers use various means of communication (e.g., email, chatbots, phone calls, etc.) to request customer service. Certain aspects of the disclosure also recognize that an organization often creates service request records that include information relating to such communications, the service requested, the identification of the customer, as well as information on the orders that are the subject of the request. In certain customer service systems, this information may be obtained from operators of a customer service center (centralized, decentralized, etc.) and stored as customer transaction level data (number of inbound calls, all outbound calls, total activities, emails, activities flags, dispatch counts, etc.) in a datastore. In certain organizations, information for the order (e.g., order date, asset count, contract date, system age, etc.) that is the subject of the customer request may also be stored in an order datastore that is integrated with, or separate from the transaction data store. Certain aspects of the disclosure recognize that machine learning may be applied to such customer service data to identify service requests that are likely to escalate based on the data associated with the customer service request.

Certain embodiments of the disclosed system may be implemented in one or more information handling systems used, for example, in a customer service department. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method set forth in the present disclosure. In the example shown in FIG. 1, the information handling system is configured as an escalation prediction system 100 that is intended to identify service requests from, for example, customers that may escalate to a higher level if not properly addressed. The escalation prediction system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the escalation prediction system 100 also includes network port 110 operable to connect to a network 140, which is likewise accessible by a service provider server 142. The escalation prediction system 100 likewise includes system memory 112, which is interconnected to the foregoing via one or more buses 114. System memory 112 further comprises operating system (OS) 116 and in various embodiments may also comprise escalation prediction modules 118. In certain embodiments, the escalation prediction modules 118 may retrieve historical service request data 120 and use that data to generate a random forest model 124. In certain embodiments, the output of the random forest model 124 is a set of records identified in the historical service request data 120 that are likely to escalate. In some instances, application of the random forest model 124 may result in identification of service request records that, although having some escalation indicators, are in fact false positives. Therefore, in certain embodiments, the data output from the random forest model 124 may be applied to a false positive reduction engine 126 to reduce the number of identified customers service requests that may include false escalation predictions. In certain embodiments, an escalation prediction engine 128 receives the output of the false positive reduction engine 126 and identifies and, in some embodiments, prioritizes the service request records according to the probabilities of escalation of the service request records. In certain embodiments, one or more of the escalation prediction modules 118 may derive decision tree rules from service request records having high probabilities of escalation. In certain embodiments, the decision tree rules may be used to further refine subsequent service request record elevation determinations.

In certain embodiments, current customer service request data 132 is retrieved from one or more datastores. In certain embodiments, the current customer service request data 132 is applied to the random forest model 124. In certain embodiments, the output of the random forest model 124 is provided to the input of the false positive reduction engine 126, which provides its output to the escalation prediction engine 128. In certain embodiments, the output of the escalation prediction engine is provided to an escalation predictor to user interface module 130. In certain embodiments, the escalation predictor user interface module 130 facilitates identification of customer service requests that are likely to escalate in a format suitable for a human readable interface, such as at an electronic display.

Figure 2:
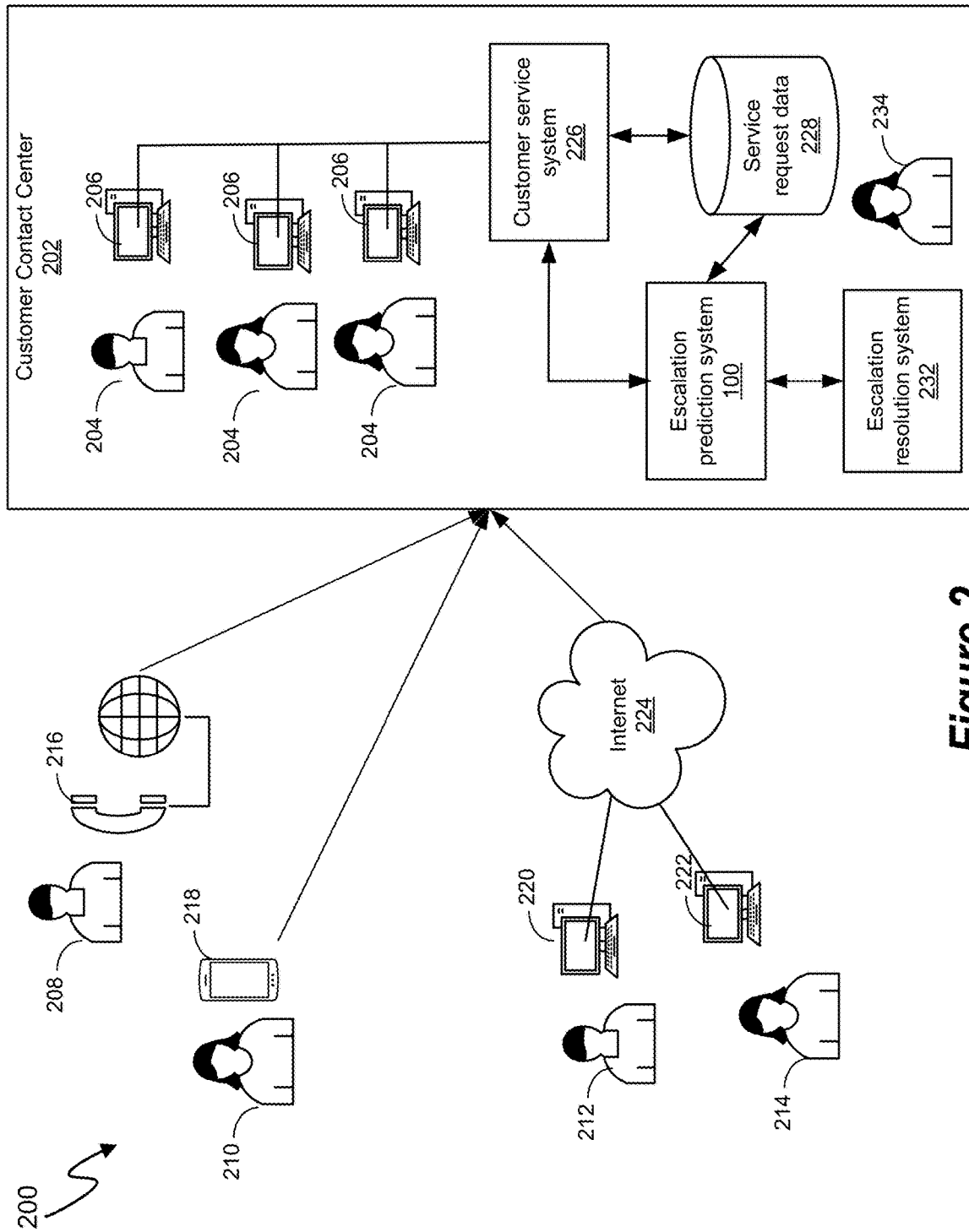
FIG. 2 is a block diagram of an electronic environment in which certain embodiments of the escalation prediction system may be employed.

FIG. 2 is a block diagram of an electronic environment 200 in which certain embodiments of the escalation prediction system 100 may be employed. In certain embodiments, the electronic environment 200 may include a customer contact center 202 that is configured to receive customer service requests from a plurality of customers 208, 210, 212, and 214 using various means of communication. In certain embodiments, the customer contact center 202 includes a plurality of contact center operators 204 interacting with a plurality of information processing systems 206. In certain embodiments, the customer contact center 202 is configured to receive customer service request from a plurality of different customers 208, 210, 212, and 214 using various means of communication. In this example, customer 208 is in communication with the customer contact center 202 using a telephone 216. Customer 210 is in communication with the customer contact center 202 using a smart phone 218. Customers 212 and 214 are in communication with the customer contact center 202 using, for example, respective computers 220 and 222 that are connected to a network, such as the Internet 224. In certain embodiments, customer 212 uses computer 220 to communicate via a chat center operated at the customer contact center 202. In certain embodiments, customer 214 communicates with the customer contact center 202 using email, a web form, etc. In certain embodiments, customers may communicate service requests to the customer contact center 202 and/or inquire as to the status of a service request. Based on the teachings of the present disclosure, it will be recognized that various means of communication may be used by customers to submit service requests and inquire as to their status, the foregoing merely being non-limiting examples.

In certain embodiments, customer service requests are provided through information processing systems 206 operated by contact center operators 204. In certain embodiments, operators 204 may access a customer service system 226 through information processing systems 206 to facilitate entry of customer service requests, update customer service requests, and obtain information regarding the status of such service requests. In certain embodiments, customer service requests and corresponding order level and/or transaction level data are stored in and retrieved from a datastore of service request data 228. In certain embodiments, the service request data 228 is accessible and editable by contact center operators 204 through the customer service system 226. Additionally, or on the alternative, the customer contact center 202 may include artificial intelligence processing systems that automatically generate customer service requests and/or update such requests in response to communications from the customers 208, 210, 212, and 214.

In certain embodiments, the service request data 228 includes data that may be used to predict the likelihood that a customer service request is likely to escalate. Accordingly, certain embodiments of the customer contact center 202 include one or more escalation prediction systems 100. In certain embodiments, the escalation prediction system 100 accesses the service request data from the service request data 228 and uses the data for the variables found in the service request records to determine whether a service request is likely to escalate, as described herein. In certain embodiments, information relating to whether a service request record is likely to escalate is provided to a contact center operator 204 through the customer service system 226 as the operator 204 is in communication with a customer. As an example, a customer service request may be flagged as a potential escalator to an operator 204 as the operator is in communication with the customer thereby allowing the operator 204 to take immediate action to potentially mitigate escalation of the customer service request. In certain embodiments, the escalation prediction system 100 may provide escalation predictions to a request resolution operator 234 using an escalation resolution system 232. In certain embodiments, the escalation prediction system 100 may provide the request resolution operator 234 with a human interface that allows the operator 234 to identify a plurality of customer service requests that have a high probability of escalating. In certain embodiments, the operator 234 may use the information regarding the customer service requests to proactively engage the customer and/or take steps to ensure that measures internal to the organization are taken to address the customer service request. As an example, the escalation resolution system may provide information to the operator 234 that allows the operator 234 to identify specific actions that may be taken to expedite and/or resolve the customer service request. For example, the escalation resolution system 232 may provide information that allows the operator 234 to schedule service personnel, ensure the proper parts have been ordered to address the request, maintain inventory, etc.

Figure 3:
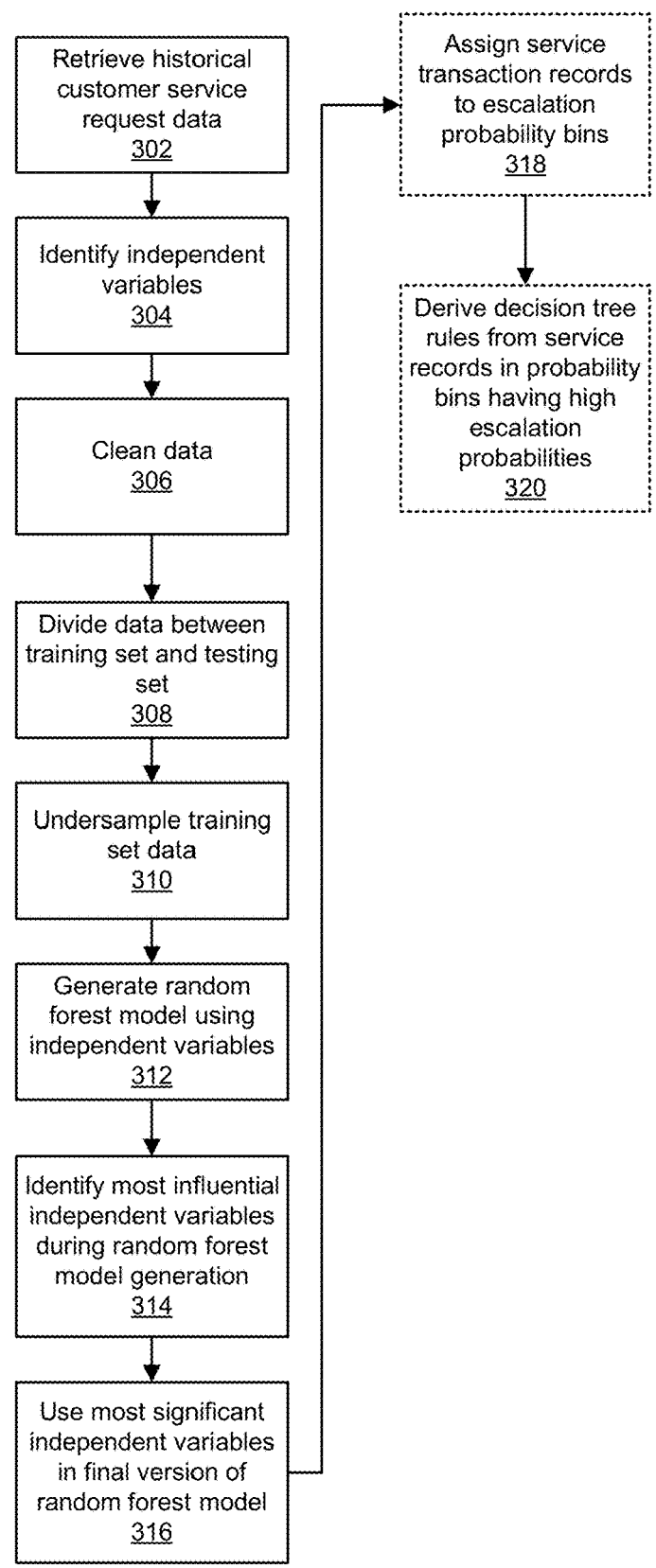
FIG. 3 depicts an exemplary table of independent variable fields that may be included in the records of the service request data.

In certain embodiments, the service request data 228 includes records having data fields corresponding to variables that may be used to predict whether a customer service request is likely to escalate. In certain embodiments, the data fields may correspond to order level fields (e.g., order date, asset count, contract date, system age, etc.) and/or transaction level fields (e.g., number of inbound calls, number of all outbound calls, total customer contact activities, total number of service requests associated with a customer account, whether a communication regarding the customer service request has been transferred from chat to phone, how many times personnel have been dispatched to resolve the customer service request, etc.) FIG. 3 depicts an exemplary table of independent variable fields that may be included in the records of the service request data. Based on the teachings of the present disclosure, it will be recognized that these fields are merely non-limiting examples and that other independent variables may be used to predict whether a customer service request is likely to escalate.

FIG. 3 is a flowchart depicting exemplary operations that may be executed by the escalation prediction system 100. In this example, historical customer service request data is retrieved at operation 302. At operation 304, certain embodiments identify independent variables that are used in the historical customer service request data. In certain embodiments, the independent variables may include transaction level variables (number of inbound calls, all outbound calls, total activities, emails, activities flags, dispatch counts, etc.). In certain organizations, the independent variables may include transaction information for the order (e.g., order date, asset count, contract date, system age, etc.) that is the subject of the customer request. FIG. 4 is a table illustrating exemplary independent variables that may be included in the historical customer service request data and used in subsequent processing to identify customer service requests that are likely to escalate.

Once the historical customer service request data has been retrieved and the independent variables have been identified, certain embodiments may execute operations to prepare the data for use by a machine learning model. In certain embodiments, the historical data is cleaned at operation 306 and divided between at least a training set and a testing set at operation 308. In certain embodiments, the data cleaning operation 306 may include removing invalid data values, interpolating data values for independent variables having missing data, normalizing the data, etc. In certain embodiments, the data is divided at operation 308 so that 75% of the data is used as a training data set, and 25% of the data is used as the testing data set.

Figure 5:
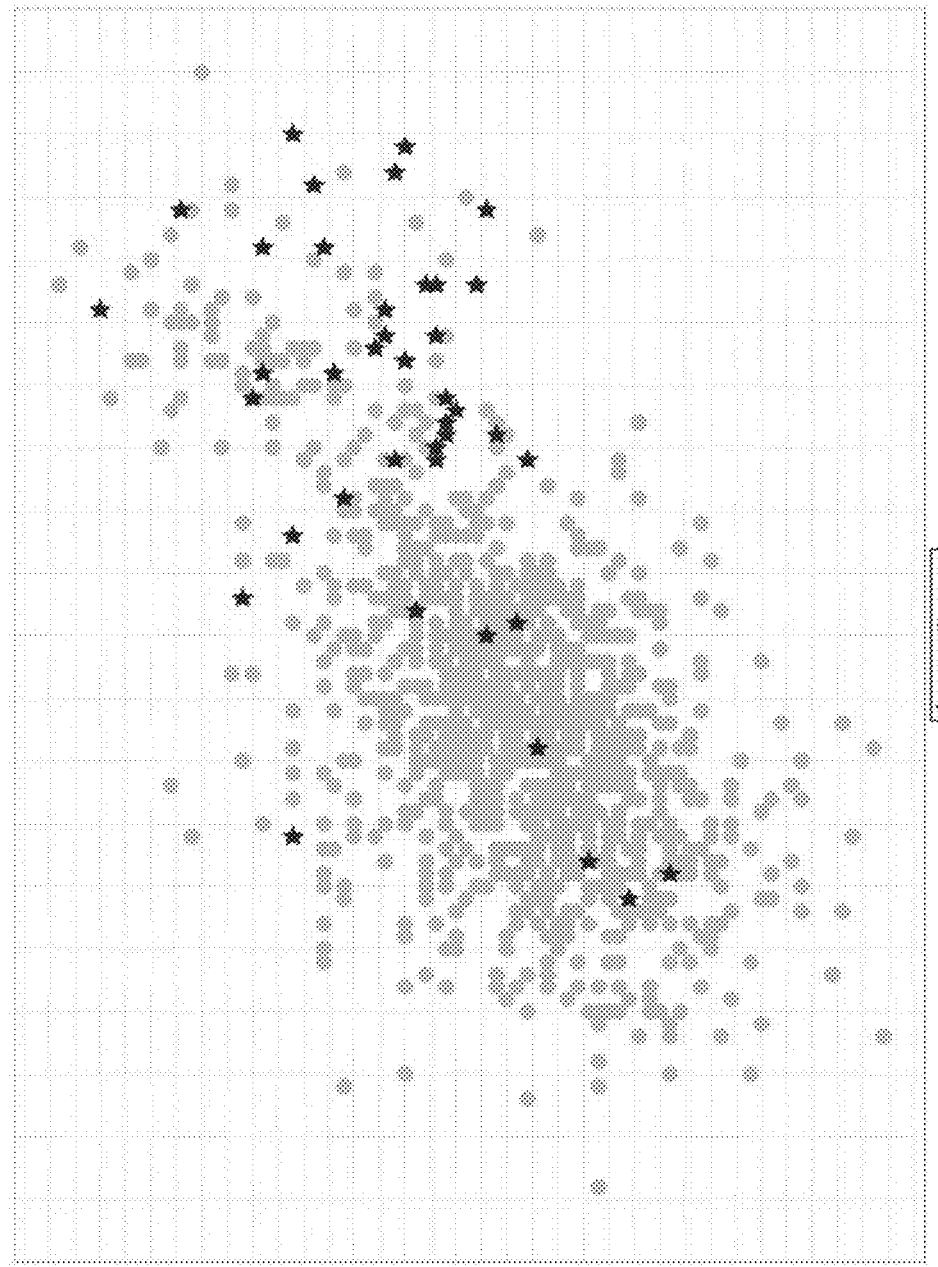
FIG. 5 depicts one example of a scatter plot showing a comparison between two independent variables and their relationship to records that have escalated.

Certain aspects of the present disclosure appreciate that there is typically not a direct correlation between any independent variable and whether the customer service request has escalated. Accordingly, during machine learning operations, certain embodiments compare each independent variable with one or more other independent variables to determine whether a combination of independent variables is indicative of a probability of escalation. One example of a scatter plot showing a comparison between two independent variables is shown in FIG. 5. In certain embodiments, the number of customer service requests within the data that have escalated is substantially larger than the number of customers service requests that have not escalated. Accordingly, with reference to FIG. 3, certain embodiments under sampled the training set data at operation 310 to provide a training set that includes a more significant representation of the customer service requests that have escalated in the data. In this manner, certain embodiments provide independent variables and corresponding variable data that may be used to more accurately generate a machine learning model that may be used to predict customer service request escalations.

Certain aspects of the present disclosure also appreciate that a random forest model provides an accurate prediction of escalations since the model uses a comparison of multiple independent variables with one another to predict escalations. Accordingly, certain embodiments of the disclosure generate a random forest tree at operation 312 using a combination of the independent variables identified at operation at operation 304. As used herein, a Random Forest is a form of supervised machine learning in which an ensemble of random forest decision trees are trained using a "bagging" method that combines learning models to increase the accuracy of the overall result. Random Forest Models can be used with both classification and regression analysis. Certain embodiments of the disclosure may use classification analysis, regression analysis, or a combination of both analyses to in the random forest model.

In certain embodiments, the random forest model generation adds randomness to the model while growing the trees. As an example, instead of searching for the most important independent variable while splitting a node, the random forest model may search for the best independent variables among a random subset of independent variables for use in the model thereby resulting in a diversity of decision trees having different relationships between the independent variables that generally results in a more accurate model.

Figure 6:
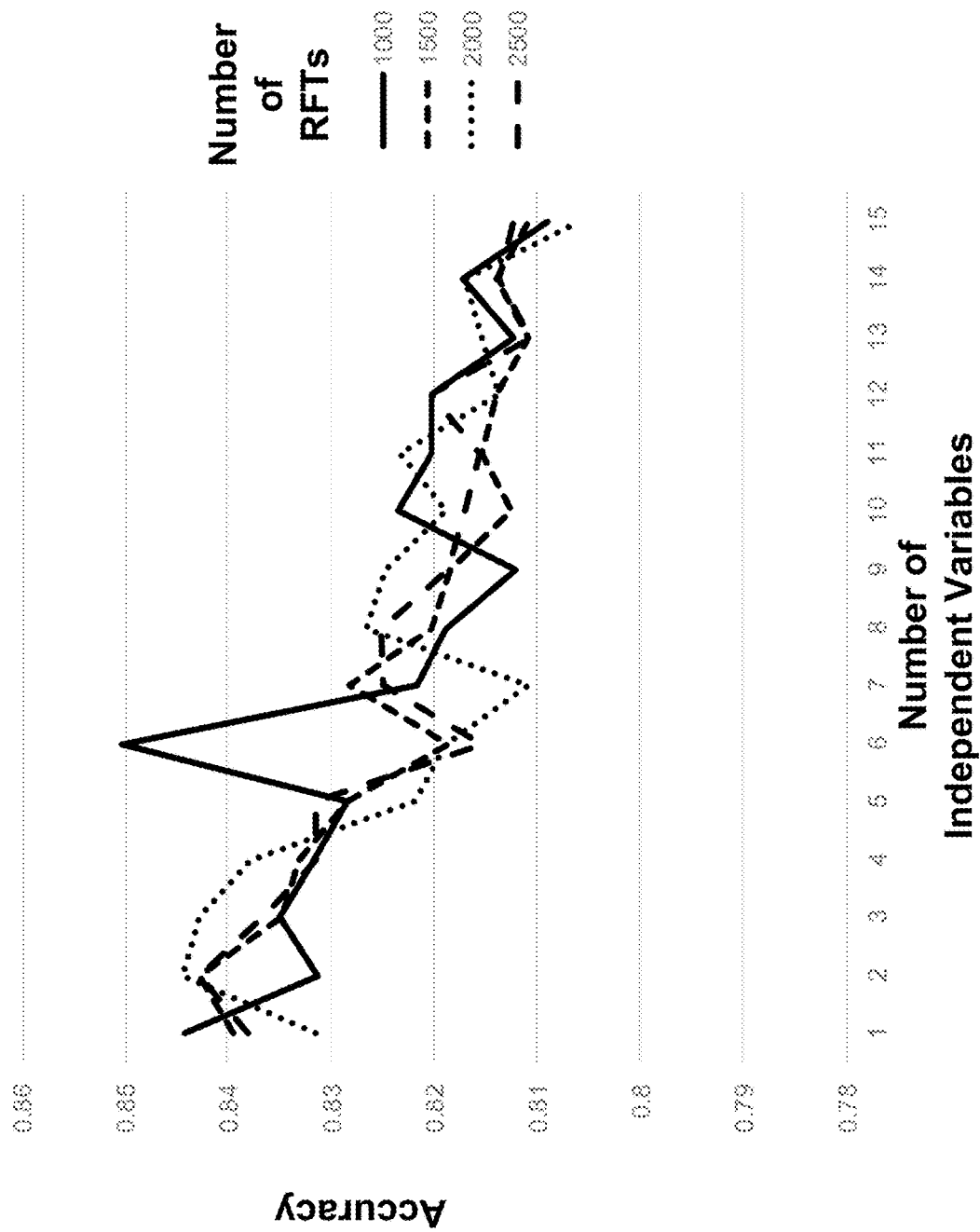
FIG. 6 is a graph depicting one example of a relationship that may exist in certain embodiments between the accuracy of the random forest model, the number of independent variables, and the number of random forest trees used in the random forest model.

During generation of the random forest model, certain embodiments use machine learning operations to balance the accuracy of the model with the number of independent variables and decision trees used in the Random Forest. In this manner, certain embodiments simplify the model for efficient processing when applied to subsequently acquired customer service request data. Additionally, introducing such balances may be used in certain embodiments to avoid overfitting the model. FIG. 6 is a graph depicting one example of a relationship that may exist in certain embodiments between the accuracy of the model, the number of independent variables, and the number of random forest trees used in the random forest model. In this example, the graph indicates that an optimal model accuracy may be achieved using six independent variables (the selection of which are described herein) and one thousand random forest trees. It will be recognized in view of the teachings of the present disclosure, however, that FIG. 6 is merely an illustrative, non-limiting example. Other relationships between the independent variables, number of random forest trees, and accuracy of the model may exist in other systems operating in accordance with the teachings of the present disclosure.

In certain embodiments, the most influential independent variables affecting whether a customer service request will escalate are identified during the random forest model generation at operation 314. In certain embodiments, the most significant independent variables identified at operation 314 are included in the final version of the random forest model at operation 316. In certain embodiments, only the most influential independent variables are incorporated into the random forest model based, for example, on the optimizations expressed in connection with FIG. 6 and described herein.

There are a number of different manners in which the most influential variables affecting a prediction of escalation may be identified. In certain embodiments, importance of an independent variable may be based on how much the accuracy of the model decreases when the variable is excluded from the model. In certain embodiments, the importance of an independent variable may be based on the decrease of Gini impurity when a variable is chosen to split a node. Certain embodiments may implement one or both of these analyses to determine the most significant independent variables that are to be included in the model.

Figure 7:
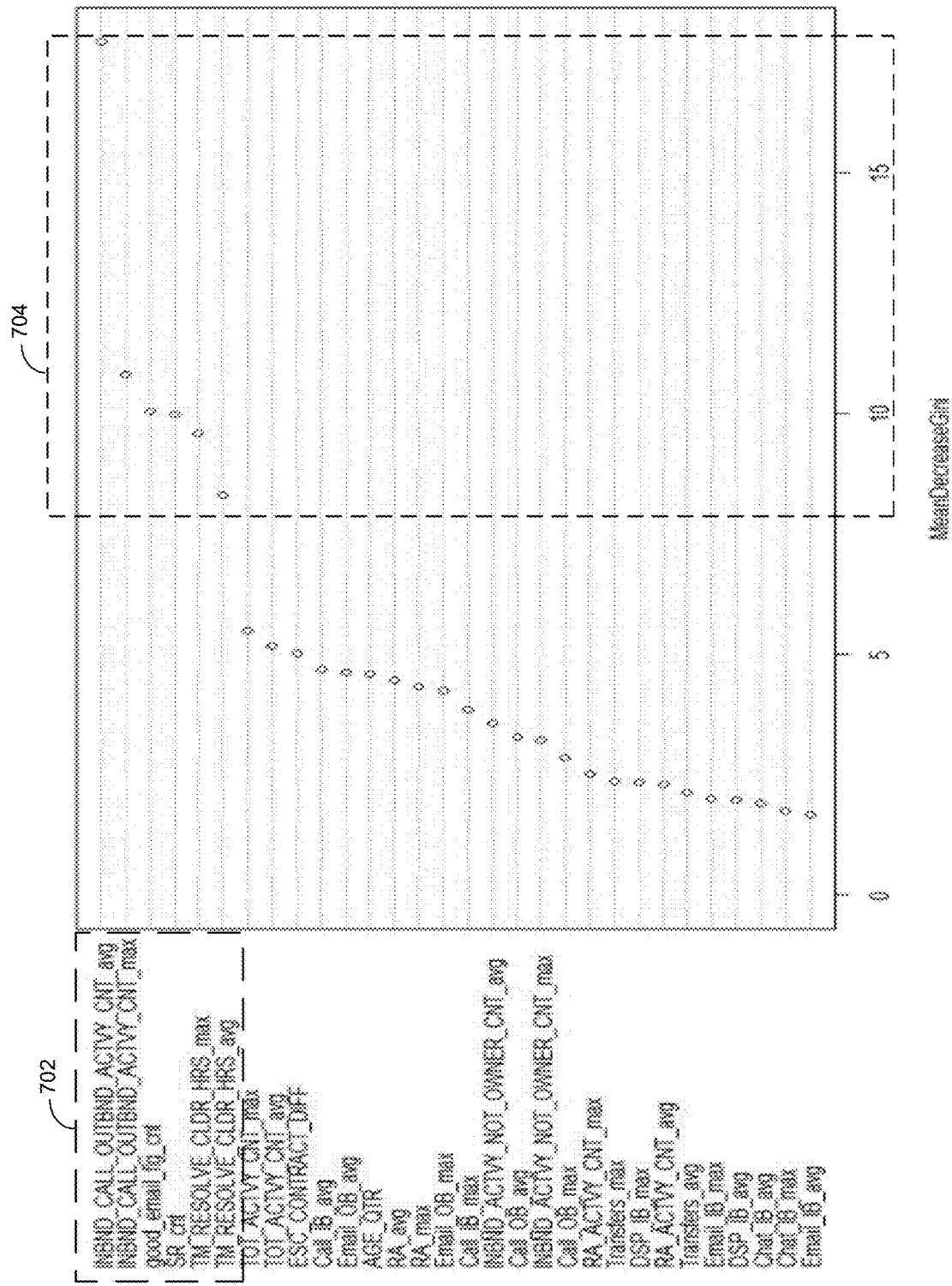
FIG. 7 is a graph depicting the mean decrease gini determined during the Random Forest generation for various independent variables described in FIG. 4.

FIG. 7 is a graph depicting the mean decrease gini determined during the Random Forest generation for various independent variables described in FIG. 4. In this example, the six most significant independent variables are identified in box 702 and the Gini values for the independent variables are identified in box 704.

With reference to FIG. 3, certain embodiments the test set of service request records are applied to the random forest model to identify escalation probabilities for the records. In certain embodiments, service request records in the test set are assigned to a plurality of escalation probability bins at operation 318. In certain embodiments, the test set of service request records are generally equally divided between the plurality of probability bins. In certain embodiments, service request records of the test set are assigned to a probability bin based on the escalation probability of the service request record. At operation 320, certain embodiments generate a decision tree using the subset of independent variables.

As an example, assume that the random forest model identifies 7200 service records that are likely to escalate. The 7200 service records may be divided into, for example, deciles such that each probability bin includes 720 service records. The service records are assigned to the probability bins based on the escalation probability of the record. In certain embodiments, the 720 service records having the highest escalation probability may be assigned to a $10^{th}$ decile bin. The set of 720 service records having the next highest escalation probability may be assigned to the $9^{th}$ decile bin. This process may be continued in certain embodiments until each probability bin includes 720 service records having the same decile probability of escalation.

Certain embodiments of the present disclosure recognize that the majority of service records having the highest escalation probability exist in the higher decile bins, such as the $10^{th}$ decile bin. In certain embodiments, the service records having the highest escalation probability are used to generate a decision tree having a fixed set of business rules that may be applied to provide increased granularity in determining which records within the probability bin are in the greatest need of being addressed by customer service. For example, certain embodiments may generate a decision tree to prioritize the service request records in a probability bin into high, medium, and low priority records. As applied to the foregoing example, application of the decision tree to the records of a probability bin may determine that there are 120 records having a high-priority, 300 records having a medium priority, and 300 records having a low priority. Based on this prioritization, customer service personnel may take different actions based on the priority level of the records. As an example, customer service personnel may directly call accounts falling into the set of highest priority records, email accounts falling into the set of medium priority records, and take behind-the-scenes actions (e.g., ensure parts are ordered, service personnel are scheduled, etc.) for the set of low priority records. Based on the teachings of the present disclosure, it will be appreciated that various levels other than "high", "medium", and "low" priority classifications may be employed. It will also be recognized, based on the teachings of the present disclosure, that multiple probability bins may be combined to generate a decision tree suitable for prioritizing the service request records included in the combined probability bins. As an example, one or more decision trees may be generated to prioritize the service request records of the $10^{th}$ decile bin, while one or more additional decision trees may be generated to prioritize the service request records of a combination of the $8^{th}$, $7^{th}$, and $6^{th}$ decile bins.

Figure 8:
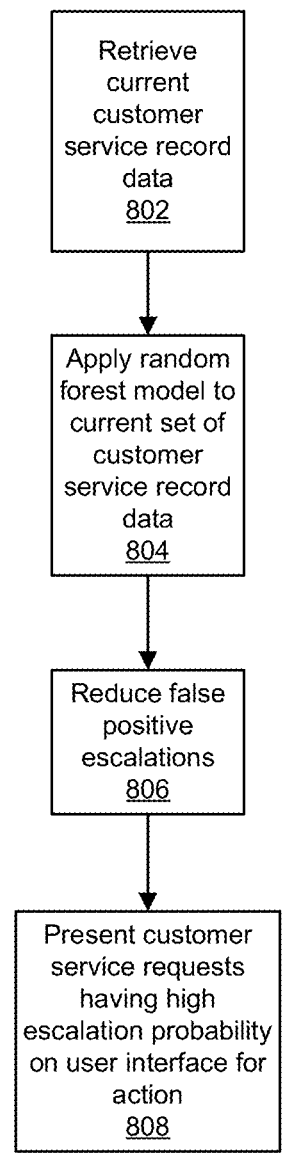
FIG. 8 is a flowchart depicting exemplary operations that may be employed to current service request records once a random forest model has been generated.

FIG. 8 is a flowchart depicting exemplary operations that may be employed to current service request records once the random forest model has been generated. In certain embodiments, the current service request records that are to be analyzed are retrieved at operation 802. At operation 804, the data for the independent variables of each service request record in the current set may be extracted and applied individually to the random forest model.

Figure 9:
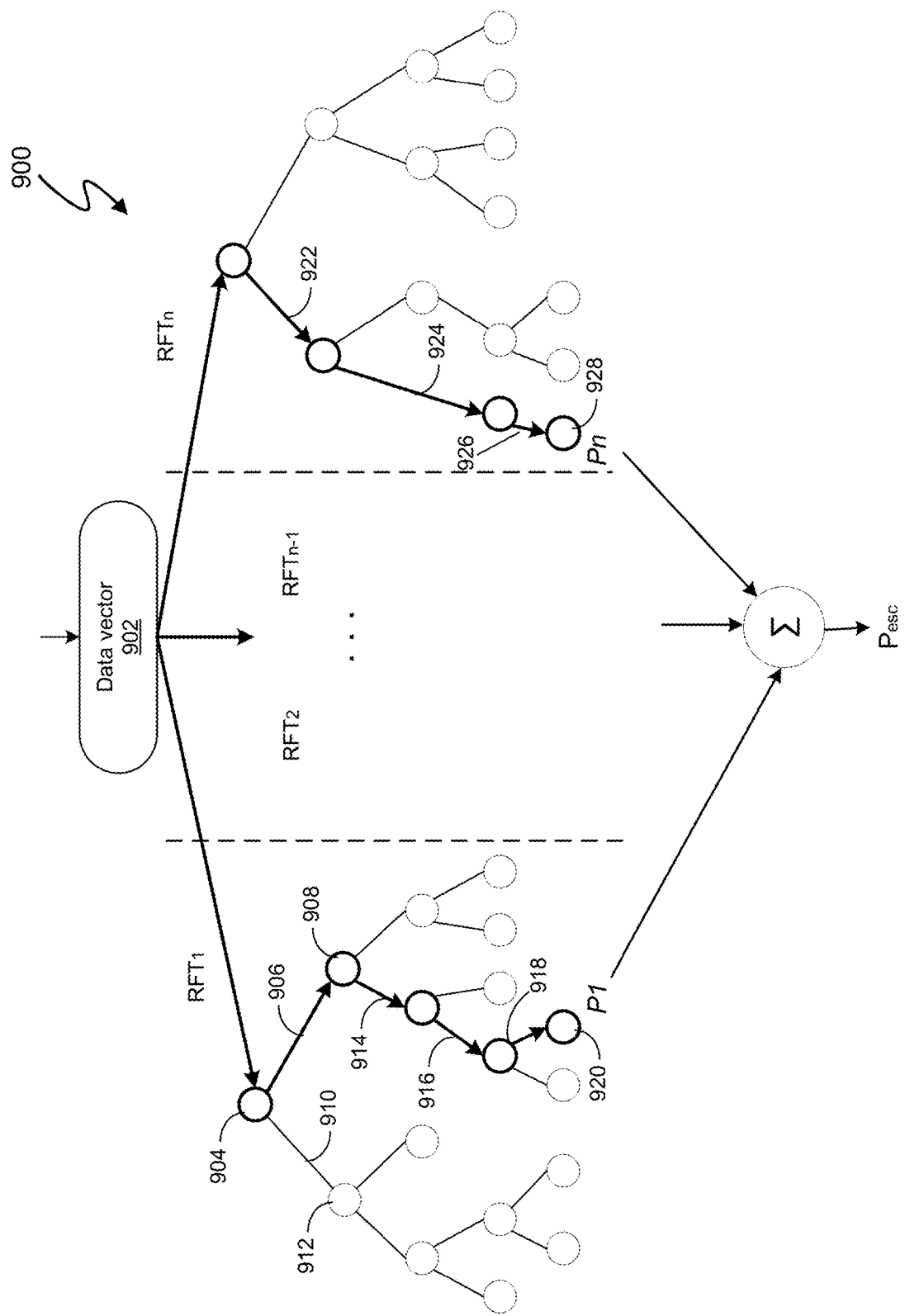
FIG. 9 depicts application of a random forest model to a service request record to determine the escalation probability of that record as implemented in certain embodiments.

FIG. 9 depicts application of a random forest model 800 to a service request record to determine the escalation probability of that record as implemented in certain embodiments. In certain embodiments, the random forest model 900 receives a data vector 902 having data extracted from the independent variables of the service request record. In certain embodiments, the data vector 902 is provided to a plurality of random forest trees $RFT_1$ through $RFT_n$. Each random forest tree $RFT_1$ through $RFT_n$ includes a plurality of decision nodes (e.g., node 904) corresponding to independent variables at which the random forest tree is split. Further, each random forest tree RFT1 through RFTn includes branches (e.g., 906) used to establish the criterion for transition to a subsequent node. As an example, node 904 may correspond to the independent variable INBND_CALL_OUYBND_ACTVY_CNT_avg (see FIG. 7). In certain embodiments, $RFT_1$ may branch to node 908 if the conditions of branch 906 (e.g., the value of INBND_CALL_OUYBND_ACTVY_CNT_avg≤10) meets a first criterion, and branch to node 912 if the conditions of branch 910 (e.g. the value of INBND_CALL_OUYBND_ACTVY_CNT_avg≤10) are met. In the specific example shown in FIG. 9, $RTF_1$ is shown proceeding along branches 906, 1914, 916, and 918 to arrive at decision node 920. In certain embodiments employing regression analysis, decision node 920 is associated with a probability Pi that the service request record will escalate based on the criterion of random forest tree $RFT_1$. In certain embodiments employing a classification model for the random forest tree $RFT_1$, decision node 920 may classify the service request record as likely to escalate or not likely to escalate.

In FIG. 9, $RTF_n$ is shown proceeding along branches 922, 924, and 926 to arrive at decision node 928. In certain embodiments employing regression analysis, decision node 928 is associated with a probability $P_n$ that the service request record will escalate based on the criterion of random forest tree $RFT_n$. In certain embodiments employing a classification model for the random forest tree $RFT_n$, decision node 928 may classify the service request record as likely to escalate or not likely to escalate.

In certain embodiments, multiple nodes within the same random forest tree may use the same independent variable. Additionally, or on the alternative, in certain embodiments, multiple nodes within different random forest trees may use the same independent variable. It will be recognized, based on the teachings of the present disclosure, that the combination of independent variables used at the nodes of the random forest trees is dependent on the final version of the random forest model generated at operations 312 and/or 316 of FIG. 3.

In certain embodiments, the random forest model 900 combines the output of the final decision nodes of each random forest tree $RFT_1$ through $RFT_n$ to generate a probability $P_{esc}$ that the current service request record will escalate.

In certain embodiments, the application of the random forest model 900 to the records of the current set of service request records may result in false identification of records. That is, the random forest model 900 may flag or otherwise identify records as likely to escalate when, in fact, they are not likely to escalate. Accordingly, certain embodiments apply one or more techniques at operation 806 to reduce the number of false positives (described herein) before identifying service request records having a high probability of escalation to a user (e.g., a customer service representative). In certain embodiments, the service request records having a high probability of escalation may be presented to a user at a user interface, such as a display or the like. It will be recognized, based on the teachings of the present disclosure, that the service request records or any other data indicative of whether a service request record is likely to escalate may be presented to the user in any number of different formats. As one example, the likelihood that a service request record will escalate may be presented to a customer service representative in real-time as a field along with other customer information while the representative is in current communication with an customer. As another example, service request records or any other data indicative of whether a service request record is likely to escalate may be presented in a separate interface to a customer service representative specifically designated to address high escalation probability service request records.

Figure 10:
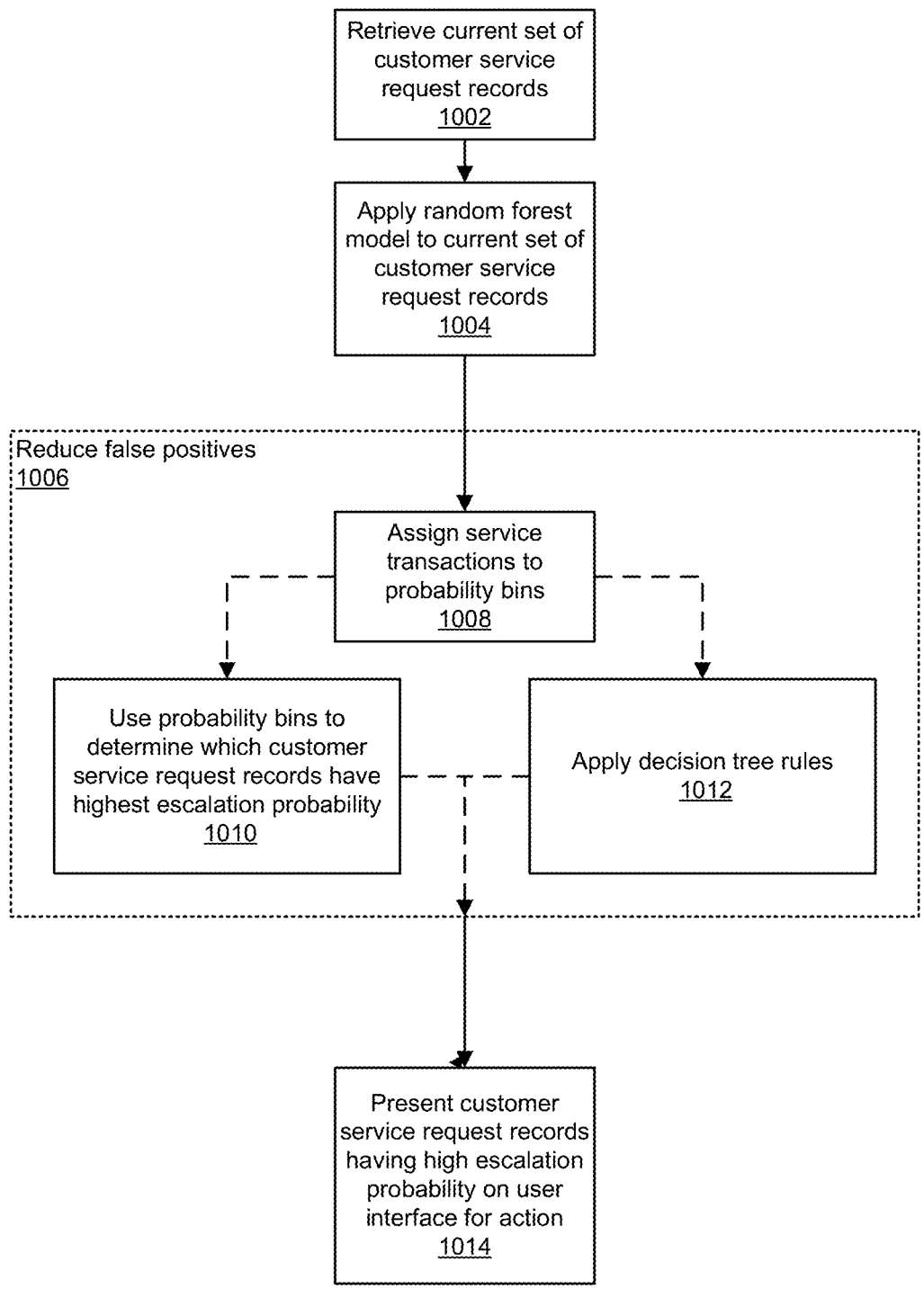
FIG. 10 is a flowchart depicting exemplary operations that may be implemented in certain embodiments to identify service request records that are likely to escalate.

FIG. 10 is a flowchart depicting exemplary operations that may be implemented in certain embodiments to identify service request records that are likely to escalate. In this specific example shown in FIG. 10, a current set of service request records are retrieved at operation 1002 and applied to the random forest model at operation 1004. Certain embodiments take various approaches at operation 1006 to reduce the number of false positive escalations received from the random forest model. In certain embodiments, service request records received from the random forest model are assigned to a plurality of escalation probability bins at operation 1008. In certain embodiments, the service request records having a potential for escalation are identified by the random forest model and are generally equally divided between the plurality of probability bins. In certain embodiments, service request records are assigned to a probability bin based on the escalation probability of the service request record as determined by the random forest model.

Figure 11:
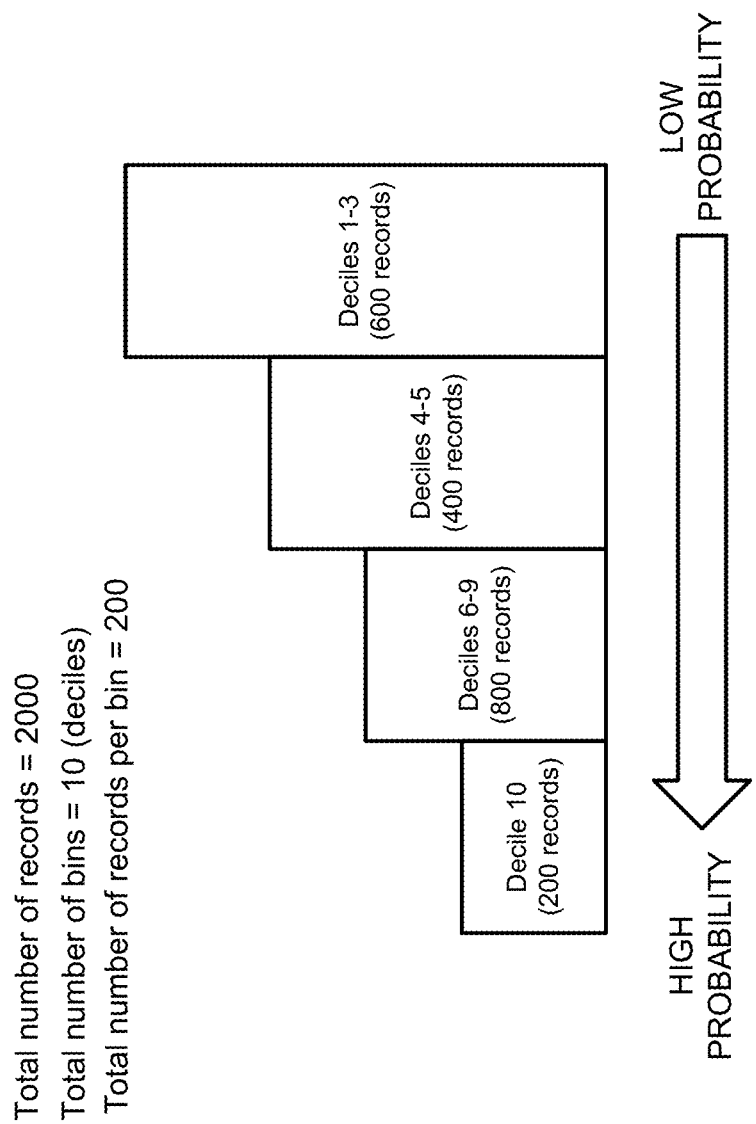
FIG. 11 illustrates one manner in which the records may be divided between a plurality of probability bins in certain embodiments.

FIG. 11 illustrates one manner in which the records may be divided between the plurality of probability bins in certain embodiments. In this example, the service request records are divided into deciles, although other probability distributions may be employed. Also, in this example, it is assumed that the random forest model has identified 2000 service request records that may escalate. Accordingly, since there are 10 deciles, each decile bin includes 200 records. In certain embodiments, the probability bins are used to determine which service request records have the highest likelihood of escalation. As one example, most of the records in the $10^{th}$ decile range may have a very high likelihood of escalation needing immediate attention, while records in the $6^{th}$ through $9^{th}$ decile range may have a lower likelihood of escalation and need not be addressed with the same degree of importance. As shown in FIG. 10, the probability bins may be used at operation 1010 to determine which service request records have the highest and/or high escalation probabilities and/or which service request records are likely false positives.

As described herein, certain embodiments may generate one or more decision trees that may be applied to the records in the probability bins to provide further granularity to the identification of records likely to escalate. In the example of FIG. 10, one or more decision tree rules may be applied to the service request records in the $10^{th}$ decile to assign priority levels to the records within the bin. In certain embodiments, a decision tree may be used to divide records within a bin to records having "high", "medium", and/or "low" priorities. In certain embodiments, the decision tree may merely identify service request records within a bin that fall into a particular categorization defined by a business rule. For example, a rule instance of SR_cnt>=4.5 & Call_OB_max>3.5 & DPS_CNT<2.5 & TOT_ACTVY_CNT_max>=10.5, may be applied to the service request records within a bin to distinguish such records from other records. In certain embodiments, the rule instance may be used to identify a single class of service request records (e.g., high-priority service request records that are to be addressed immediately), as opposed to dividing the service request records within a bin between multiple classes (e.g., multiple priorities levels to the records in the bin). In certain embodiments, rule instances may be used to identify the manner in which records meeting the rule instance criterion are to be addressed (e.g., direct call, email, web contact, etc.). It will be recognized, based on the teachings of the present disclosure, that specific rule instances and the manner in which the instances are used may vary depending on the specific implementation of the escalation prediction system.

In certain embodiments, service request records having a high escalation of probability are presented on a user interface at operation 1014. As described herein, the manner in which the escalation prediction system presents the service request records to the user may vary based on specific system design criterion.

As will be appreciated by one skilled in the art, the system disclosed herein may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object oriented programming language such as Java, Smalltalk, C++ or the like. However, the computer program code for carrying out operations of the disclosed system may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments of the disclosed system, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for identifying potential escalations of customer service requests, comprising:
   generating a random forest model using a training set of service request records to determine a probability of escalation for service requests of the training set, service request records of the training set including data relating to independent variables that are analyzed while generating the random forest model;
   applying the random forest model to a current set of service request records to determine an escalation probability for service requests in the current set;
   assigning service request records in the current set to a plurality of escalation probability bins, wherein the service request records of the current set are generally equally divided between the plurality of escalation probability bins, and wherein the service request records of the current set are assigned to a probability bin based on the escalation probability of the service request record
   identifying a subset of independent variables during generation of the random forest model that are most influential in determining the escalation probabilities;
   assigning service request records in a test set to a plurality of escalation probability bins, wherein the test set of service request records are generally equally divided between the plurality of escalation probability bins, wherein service request records of the test set are assigned to a probability bin based on the escalation probability of the service request record;
   generating a decision tree using the subset of independent variables, the decision tree being generated using service request records in a probability bin associated with a highest escalation probability; and,
   applying rules of the decision tree to current service request records assigned to the probability bin associated with the highest escalation probability to further identify whether one or more of the current service request records are likely to escalate.

2. The computer-implemented method of claim 1, wherein
   the plurality of escalation probability bins divide the service request records in the current set into deciles.

3. The computer-implemented method of claim 1, further comprising:
   under sampling the training set of service request records for use in generating the random forest model.

4. The computer-implemented method of claim 1, wherein the service request records of the training set include data relating to independent variables that are analyzed while generating the random forest model, the method further comprising:
   identifying a subset of independent variables for use in the random forest model using one or more of a mean decrease accuracy and/or mean decrease gini technique to identify independent variables that are most influential in determining the escalation probabilities; and
   tuning the random forest model to limit the independent variables used in the random forest model to the subset of independent variables.

5. The computer-implemented method of claim 4, wherein the independent variables include one or more of order level variables and transaction level variables.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      generating a random forest model using a training set of service request records to determine a probability of escalation for service requests of the training set, service request records of the training set including data relating to independent variables that are analyzed while generating the random forest model;
      applying the random forest model to a current set of service request records to determine an escalation probability for service requests in the current set;
      assigning service request records in the current set to a plurality of escalation probability bins, wherein the service request records of the current set are generally equally divided between the plurality of escalation probability bins, and wherein the service request records of the current set are assigned to a probability bin based on the escalation probability of the service request record;
      identifying a subset of independent variables during generation of the random forest model that are most influential in determining the escalation probabilities;
      assigning service request records in a test set to a plurality of escalation probability bins, wherein the test set of service request records are generally equally divided between the plurality of escalation probability bins, wherein service request records of the test set are assigned to a probability bin based on the escalation probability of the service request record;

generating a decision tree using the subset of independent variables, the decision tree being generated using service request records in a probability bin associated with a highest escalation probability; and, applying rules of the decision tree to current service request records assigned to the probability bin associated with the highest escalation probability to further identify whether one or more of the current service request records are likely to escalate.

7. The system of claim 6, wherein
the plurality of escalation probability bins divide the service request records in the current set into deciles.

8. The system of claim 6, wherein the instructions are further configured for:
under sampling the training set of service request records for use in generating the random forest model.

9. The system of claim 6, wherein the service request records of the training set include data relating to independent variables that are analyzed while generating the random forest model, wherein the instructions are further configured for:
identifying a subset of independent variables for use in the random forest model using one or more of a mean decrease accuracy and/or mean decrease gini technique to identify independent variables that are most influential in determining the escalation probabilities; and
tuning the random forest model to limit the independent variables used in the random forest model to the subset of independent variables.

10. The system of claim 9, wherein the independent variables include one or more of order level variables and transaction level variables.

11. A non-transitory, computer-readable storage medium embodying computer program code, the computer program code comprising computer executable instructions configured for:
generating a random forest model using a training set of service request records to determine a probability of escalation for service requests of the training set, service request records of the training set including data relating to independent variables that are analyzed while generating the random forest model;
applying the random forest model to a current set of service request records to determine an escalation probability for service requests in the current set;
assigning service request records in the current set to a plurality of escalation probability bins, wherein the service request records of the current set are generally equally divided between the plurality of escalation probability bins, and wherein the service request records of the current set are assigned to a probability bin based on the escalation probability of the service request record;
identifying a subset of independent variables during generation of the random forest model that are most influential in determining the escalation probabilities;
assigning service request records in a test set to a plurality of escalation probability bins, wherein the test set of service request records are generally equally divided between the plurality of escalation probability bins, wherein service request records of the test set are assigned to a probability bin based on the escalation probability of the service request record;
generating a decision tree using the subset of independent variables, the decision tree being generated using service request records in a probability bin associated with a highest escalation probability; and,
applying rules of the decision tree to current service request records assigned to the probability bin associated with the highest escalation probability to further identify whether one or more of the current service request records are likely to escalate.

12. The non-transitory, computer-readable storage medium of claim 11, wherein
the plurality of escalation probability bins divide the service request records in the current set into deciles.

13. The non-transitory, computer-readable storage medium of claim 11, wherein the instructions are further configured for:
under sampling the training set of service request records for use in generating the random forest model.

14. The non-transitory, computer-readable storage medium of claim 11, wherein the service request records of the training set include data relating to independent variables that are analyzed while generating the random forest model, wherein the instructions are further configured for:
identifying a subset of independent variables for use in the random forest model using one or more of a mean decrease accuracy and/or mean decrease gini technique to identify independent variables that are most influential in determining the escalation probabilities; and
tuning the random forest model to limit the independent variables used in the random forest model to the subset of independent variables.

* * * * *